United States Patent Office 3,635,996
Patented Jan. 18, 1972

3,635,996
CERTAIN 1-(2-PROPYNYL)-2(1H)-PYRIDONES
Chester E. Pawloski, Bay City, Mich., assignor to The Dow Chemical Company, Midland, Mich.
No Drawing. Filed Nov. 21, 1969, Ser. No. 878,903
Int. Cl. C07d 31/32
U.S. Cl. 260—297 Z
3 Claims

ABSTRACT OF THE DISCLOSURE

The present invention is directed to new and useful compounds, namely 1-(2-propynyl) - 2(1H) - pyridones corresponding to the formula:

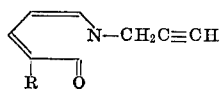

wherein R is hydrogen, lower alkyl groups of from 1 to about 4, both inclusive, carbon atoms or a straight or branched chain propynyloxy group. The compounds are suitable for use as herbicides.

GENERAL SUMMARY

The present invention is directed to new and useful compounds, namely, 1-(2-propynyl) - 2(1H) - pyridones corresponding to the formula:

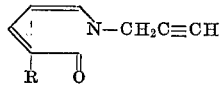

wherein R is hydrogen, lower alkyl groups of from 1 to about 4, both inclusive, carbon atoms or a straight or branched chain propynyloxy group. The novel compounds of the present invention are liquids or crystalline solid materials which are somewhat soluble in many common organic solvents and of low solubility in water. The novel compounds are suitable for use as herbicides.

As used herein, the term "lower alkyl" means saturated, monovalent aliphatic radicals, including straight and branched chain radicals of from 1 to about 4 carbon atoms, as illustrated by, but not limited to, methyl, ethyl, propyl, isopropyl, butyl, sec-butyl, and the like.

The novel compounds of the present invention are generally prepared by refluxing a predetermined pyridone or ortho-hydroxy substituted pyridine compound with 3-bromopropyne and potassium carbonate in acetone solvent. The reactants may be contacted in any convenient manner; and, while the amount of the reactants to be employed is not critical, optimum yields are recovered when the reactants are employed in essentially equimolar proportions.

Usually, the 3-bromopropyne compound is mixed initially with the other required reactants and the resulting mass is heated at its reflux temperature under atmospheric pressure for a period of time sufficient to assure substantial completion of the reaction. However, the 3-bromopropyne compound may also be controllably added over a pre-determined period of time to the refluxing mixture of the previously mixed required reactants. After the addition of the 3-bromopropyne is complete, refluxing of the resulting reaction mass at atmospheric pressure is continued for a period of time sufficient to assure substantial completion of the reaction.

Upon completion of the reaction, the compound is recovered by conventional procedures, such as filtration to separate solid products or distillation of liquid organic phases under reduced pressure.

DESCRIPTION OF PREFERRED EMBODIMENTS

The following examples further illustrate the practice of the present invention and will enable those skilled in the art to practice the same.

EXAMPLE 1

1-(2-propynyl)-3-(2-propynyloxy)-2(1H)-pyridone

Potassium carbonate (about 70 grams, 0.5 mole) and 2,3-dihydroxypyridine (30 grams, 0.25 mole) were dispersed in about 400 milliliters of acetone and the resulting mixture heated with stirring to its reflux temperature at atmosphiric pressure over a period of about one hour. 3-bromopropyne (about 65 grams, 0.5 mole) was added dropwise to the so-heated mass during a period of about 2 hours; after the 3-bromopropyne addition was complete, the refluxing of the reaction mass at atmospheric pressure was continued for about 24 hours. Following the reaction period, 300 milliliters of benzene was added to the product mass and the preparation was washed with water. The organic liquid phase containing the compound in solution was separated from the aqueous wash water and the solution allowed to stand overnight in order to remove low-boiling constituents. The organic liquid phase and the solid, crystalline material which formed therein were separated by filtration and the 1-(2-propynyl)-3-(2 - propynyloxy-2(1H)-pyridone compound was recovered as a tan, crystalline solid melting at 95°–98° C. The product structure was confirmed by infrared spectroscopy analysis.

EXAMPLE 2

1-(2-propynyl)-2(1H)-pyridone

Potassium carbonate (about 40 grams; 0.26 mole); 2(1H)-pyridone (about 25 grams, 0.26 mole), and 3-bromopropyne (about 35 grams, 0.26 mole) were dispersed in 300 milliliters of acetone and the mixture stirred and heated to reflux temperature at atmospheric pressure for about 20 hours. The reaction mass was filtered while still hot and the solids recovered were washed again with about 100 milliliters of acetone. The two acetone portions containing the product in solution were combined and the solvent removed by distillation under reduced pressure. The 1-(2-propynyl)-2(1H)-pyridone compound was recovered. This material is a dark liquid at room temperature, with a Refractive Index at 28° C. of 1.5250. The product structure was confirmed by infrared spectroscopy analysis.

The compounds of the present invention are suitable for use as herbicides. When the product is so employed, the unmodified substance can be utilized. However, the present invention also embraces the use of the compound in a formulation. Thus, for example, the compound can be dispersed in a finely divided solid and employed therein as a dust. Also, the compound, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water or water-in-oil emulsions, or water dispersions, with or without the addition of wetting, dispersing, or emulsifying agents.

In a representative operation, application of the 1-(2-propynyl)-2(1H)-pyridone compound at a concentration of 10 pounds per acre gave substantially complete control of pigweeds.

I claim:
1. A 1-(2-propynyl) - 2(1H) - pyridone compound of the formula:

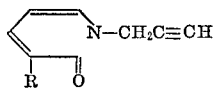

wherein R is hydrogen, lower alkyl groups of from 1 to about 4, both inclusive, carbon atoms or a straight or branched chain propynyloxy group.

2. The compound of claim 1 which is 1-(2-propynyl)-2(1H)-pyridone.
3. The compound of claim 1 which is 1-(2-propynyl)-3-(2-propynyloxy)-2(1H)-pyridone.

References Cited
UNITED STATES PATENTS
3,355,278  11/1967  Weil et al. _____ 260—297 Z ALAN L. ROTMAN, Primary Examiner U.S. Cl.X.R.
71—94